United States Patent
Eguchi (10) Patent No.: US 7,764,638 B2
(45) Date of Patent: Jul. 27, 2010

(54) MONITORING APPARATUS AND MONITORED APPARATUS

(75) Inventor: Yoshitaka Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 11/634,274

(22) Filed: Dec. 6, 2006

(65) Prior Publication Data

US 2008/0025224 A1    Jan. 31, 2008

(30) Foreign Application Priority Data

Jul. 31, 2006    (JP) .............................. 2006-208536

(51) Int. Cl.
*H04W 4/00*    (2009.01)
(52) U.S. Cl. ..................... 370/314; 370/329
(58) Field of Classification Search ................ 370/314, 370/321, 329, 294, 345, 375, 402, 395.3, 370/458, 347, 468

See application file for complete search history.

(56) References Cited

U.S. PATENT DOCUMENTS

| | | | | |
|---|---|---|---|---|
| 3,843,843 A | * | 10/1974 | Solomon et al. ............ 370/324 |
| 5,311,517 A | * | 5/1994 | Senoo ........................ 370/428 |
| 5,657,323 A | * | 8/1997 | Jan et al. .................... 370/252 |
| 6,456,633 B1 | * | 9/2002 | Chen .......................... 370/490 |
| 7,289,861 B2 | * | 10/2007 | Aneweer et al. ............ 700/110 |
| 2005/0201340 A1 | * | 9/2005 | Wang et al. ................. 370/337 |

FOREIGN PATENT DOCUMENTS

JP    59-211342    11/1984

* cited by examiner

*Primary Examiner*—Jason E Mattis
*Assistant Examiner*—Dady Chery
(74) *Attorney, Agent, or Firm*—Fujitsu Patent Center (57) ABSTRACT

A monitoring unit connected via a communication line to monitored units and serially receiving notifying information given from each of the monitored units with time division multiplexing communications, includes a receiving unit receiving information related to each of the monitored unit via the communication line from each monitored unit, a determining unit determining a timeslot length to be allocated to each monitored unit on the basis of the information related to each of the monitored units, and a notifying unit notifying each of the monitored units of the timeslot length via the communication line, wherein the receiving unit receives the notifying information from each of the monitored units at the timeslot based on the timeslot length that is notified of each monitored unit.

7 Claims, 10 Drawing Sheets

FIG. 1

PRIOR ART

FIG. 2

PRIOR ART

| SEQUENCE NUMBER | CONTROL TARGET ID (EACH/ALL) | CONTROL COMMAND | ERROR DETECTION BIT |

MONITORING UNIT FRAME

FIG. 7

INFORMATION AREA IS SET IN VARIABLE LENGTH

| SEQUENCE NUMBER | NOTIFYING INFORMATION | ERROR DETECTION BIT |

MONITORED UNIT FRAME

MONITORING APPARATUS AND MONITORED APPARATUS

BACKGROUND OF THE INVENTION

1. Field of the Invention

The present invention relates to a monitoring system in which pieces of information are serially transmitted by time-division-multiplexing from a plurality of monitored units (monitored apparatuses) to a monitoring unit (monitoring apparatus), and relates to an apparatus as a whole implemented with the monitoring unit and the monitored units.

2. Description of the Related Art

There has hitherto been a system in which a monitoring unit monitors statuses of a plurality of monitored units. Recently, it is required to reduce the number of connection signals and to perform efficient information transmission due to an increase in quantity of the information transmitted to the monitoring unit from the plurality of monitored units and an increase in the number of monitored units.

Figure 1:
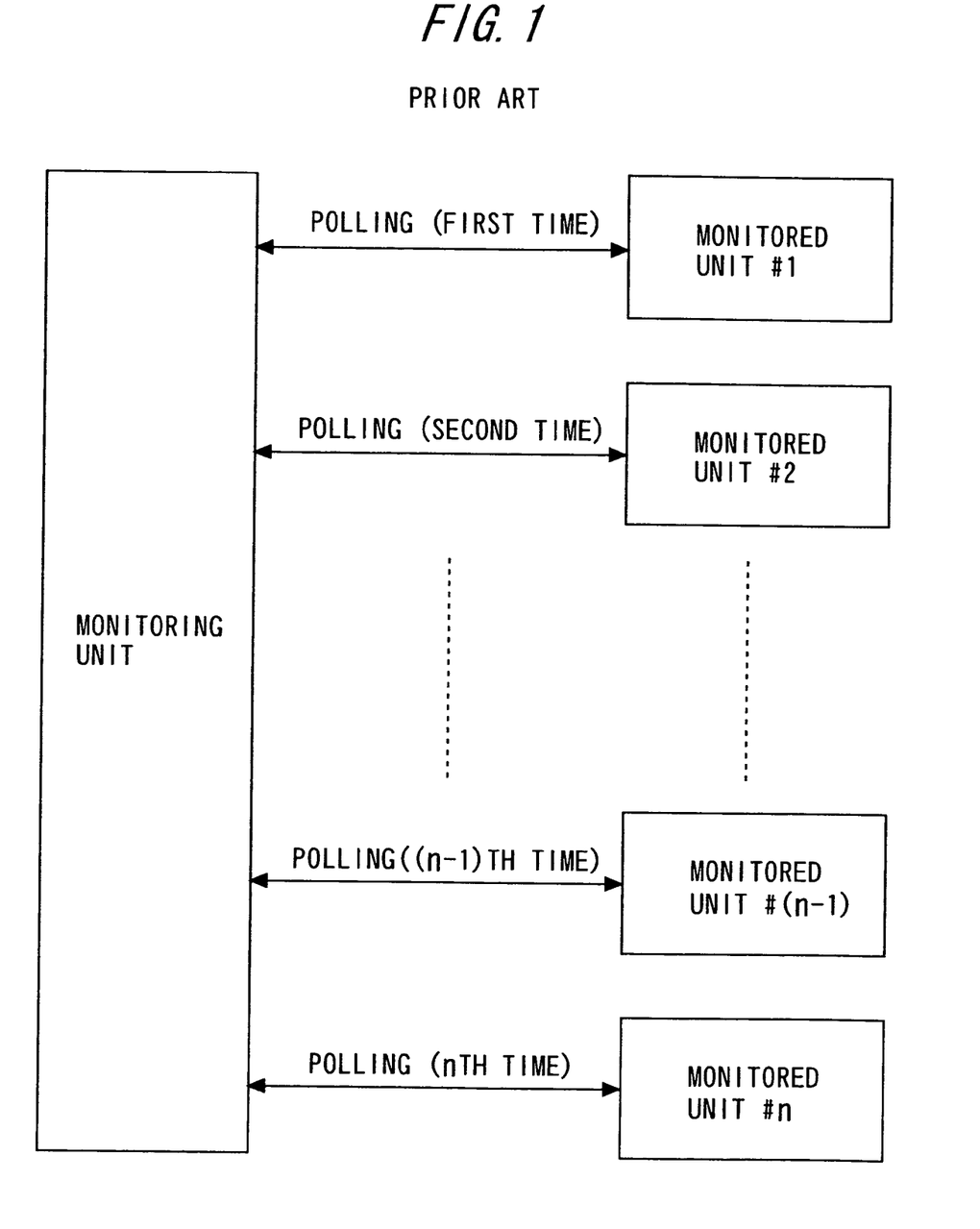
FIG. 1 is an explanatory diagram of information transmission in a polling process (n-times) of a serial signal.

FIG. 1 shows an example of the system in which the monitoring unit executes monitoring of the plurality of monitored units by a polling process of a serial signal. FIG. 1 illustrates a monitoring unit and a plurality of monitored units #1, #2, . . . , #(n-1), #n. The monitoring unit executes polling with respect to each of the plurality of monitored units #1, #2, . . . , #(n-1), #n serially and cyclically, and thus receives pieces of information from the respective monitored units.

In the system shown in FIG. 1, one-polling time is determined, and a quantity of the information transmissible by the monitored unit in this polling time is determined. Further, as the number of the monitored units rises, a polling interval for one monitored unit elongates. Therefore, the monitored unit, if unable to completely transmit the information in one-polling time, must wait for next polling for transmitting the remaining information. Thus, in the polling method using the serial signal, there is a case in which the monitoring unit takes much time for collecting the information from the respective monitored units. Further, in the system illustrated in FIG. 1, it is required that a one-to-one connection between the monitoring unit and each of the monitored units be established via a signal line. Hence, such a problem arises that if the number of the monitored units rises, the number of the connection signal lines increases.

Figure 2:
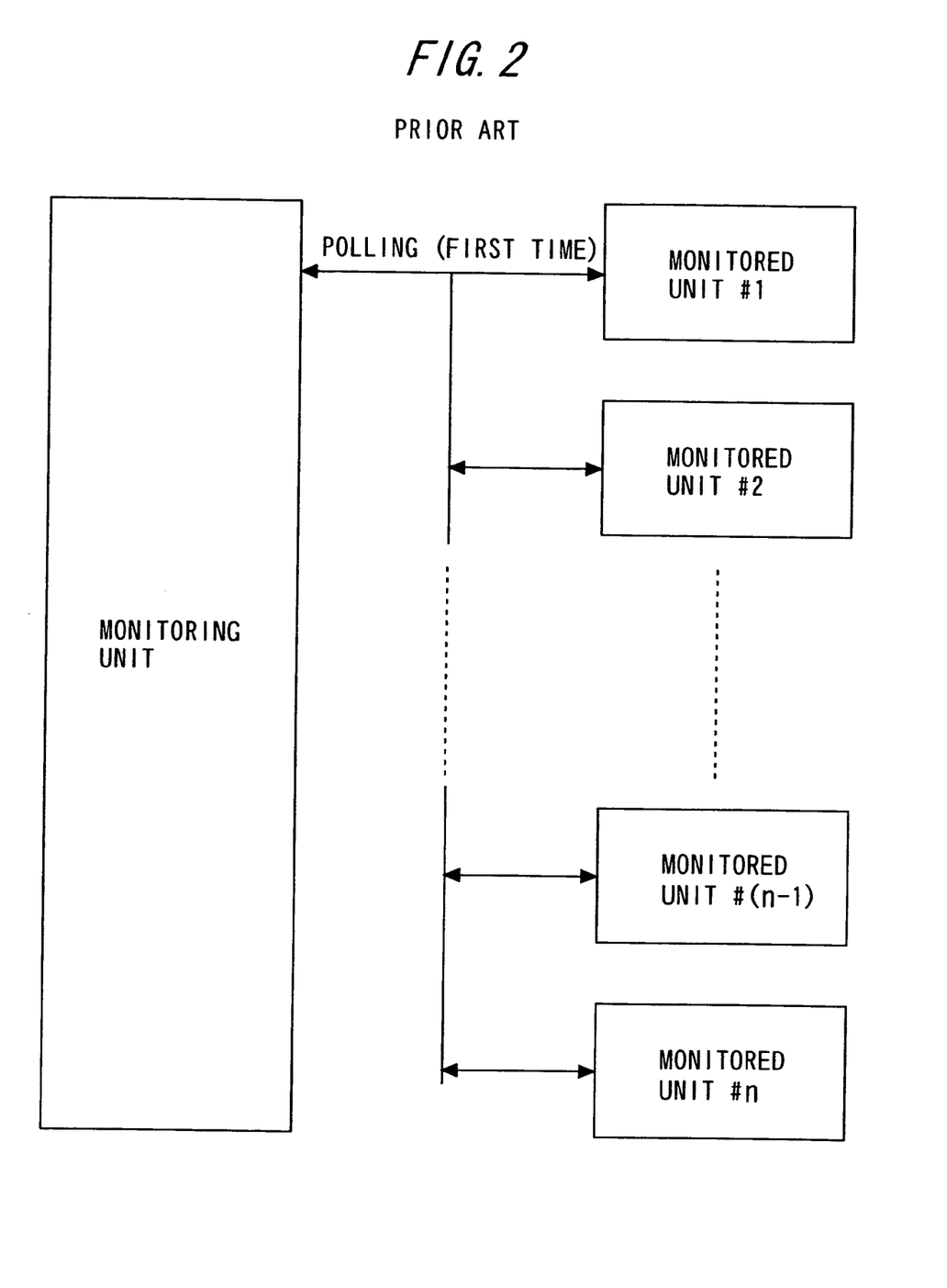
FIG. 2 is an explanatory diagram of the information transmission of a time-division-multiplexing serial signal.

FIG. 2 shows an example in which the information of the respective monitored units is transmitted by use of the time-division-multiplexing serial signal to the monitoring unit (e.g., Patent document 1). In FIG. 2, the plurality of monitored units #1 through #n is connected to the monitoring unit via the signal line in a bus type connection. A fixed-length timeslot is allocated to each of the monitored units #1 through #n, and each of the monitored units #1 through #n transmits the information to the monitoring unit at the timeslot allocated to the monitored unit itself. Namely, pieces of information from the respective monitored units are multiplexed in time-series and thus transmitted to the monitoring unit via the signal line.

In the system illustrated in FIG. 2, the monitoring unit is connected via the signal line to the respective monitored units #1 through #n in the bus type connection, and the information time-division-multiplexed on the signal line from the respective monitored units #1 through #n is transmitted as the serial signals time-division-multiplexed on the signal line to the monitoring unit. In the system shown in FIG. 2, the signal line is shared among the respective monitored units, and hence the problem about the signal line in the system illustrated in FIG. 1 is obviated.

The information multiplexing position (timeslot) allocated to each monitored unit is fixed, and therefore the timeslot can not be changed corresponding to the type and the status of each of the monitored units. Hence, such a problem occurs that the transmission efficiency declines.

Namely, the timeslot length is fixed, whereby a quantity of the information transmissible in one timeslot is determined. Further, the timeslot allocation position is also fixed. Therefore, if the monitored unit transmits the information larger in quantity than the information quantity of one timeslot to the monitoring unit, the information must be transmitted in two or more timeslots. Whereas if the information well smaller in quantity than the information quantity of one timeslot is transmitted, it takes one-timeslot time, and hence there is a case in which the monitoring unit needs to have a considerable period of time for collecting the information from the respective monitored units.

[Patent document 1] Japanese Patent Application Laid-Open Publication No.59-211342 (FIG. 2)

SUMMARY OF THE INVENTION

An object of the present invention is providing a technology capable of increasing the efficiency of transmitting the information to the monitoring unit from each of the monitored units.

The present invention adopts the following means in order to achieve the object.

Namely, a monitoring apparatus according to a first aspect of the present invention, which is connected via a communication line to monitored apparatuses and serially receives notifying information given from each of the monitored apparatuses with time division multiplexing communications, comprises:

a receiving unit receiving information related to each of the monitored apparatuses via the communication line from each of the monitored apparatuses;

a determining unit determining a timeslot length to be allocated to each of the monitored apparatuses on the basis of the information related to each of the monitored apparatuses, received by the receiving unit; and a notifying unit notifying each of the monitored apparatuses of the timeslot length determined by the determining unit via the communication line, wherein the receiving unit receives the notifying information from each of the monitored apparatuses at the timeslot based on the timeslot length that is notified of each of the monitored apparatuses.

Preferably, the information related to the monitored apparatus is type information of each of the monitored apparatuses, and the determining unit determines the timeslot length of each of the monitored apparatuses based on the type information.

Preferably, if it is detected as the information relating to each of the monitored apparatuses that a certain monitored apparatus in the monitored apparatuses is not connected to the monitoring apparatus, the determining unit determines the timeslot length to be allocated to the certain monitored apparatus is zero.

Preferably, the information related to the monitored apparatus is status information of each of the monitored apparatuses, and the determining unit determines the timeslot length of each of the monitored apparatuses based on the status information.

Further, a monitored apparatus according to another aspect of the present invention, which is connected via a communication line to a monitoring apparatus and sending notifying information onto the communication line at a timeslot allocated by the monitoring apparatus to transmit the notifying information to the monitoring apparatus, comprises:

a transmitting unit transmitting information related to the monitored apparatus via the communication line to the monitoring apparatus in response to a request given from the monitoring apparatus;

a receiving unit receiving via the communication line a timeslot length determined by the monitoring apparatus on the basis of the information related to the monitored apparatus; and a determining unit determining start timing and end timing of the timeslot allocated by the monitoring apparatus on the basis of the timeslot length received by the receiving unit, wherein the transmitting unit transmits via the communication line the notifying information to the monitoring apparatus in accordance with the start timing and the end timing of the timeslot that are determined by the determining unit.

According to the present invention, it is possible to increase the efficiency of transmitting the information from each of monitored apparatuses to the monitoring apparatus.

DETAILED DESCRIPTIONS OF THE PREFERRED EMBODIMENTS

An embodiment of the present invention will hereinafter be described with reference to the drawings. A configuration in the embodiment is an exemplification, and the present invention is not limited to the configuration in the embodiment.

<System Configuration>

Figure 3:
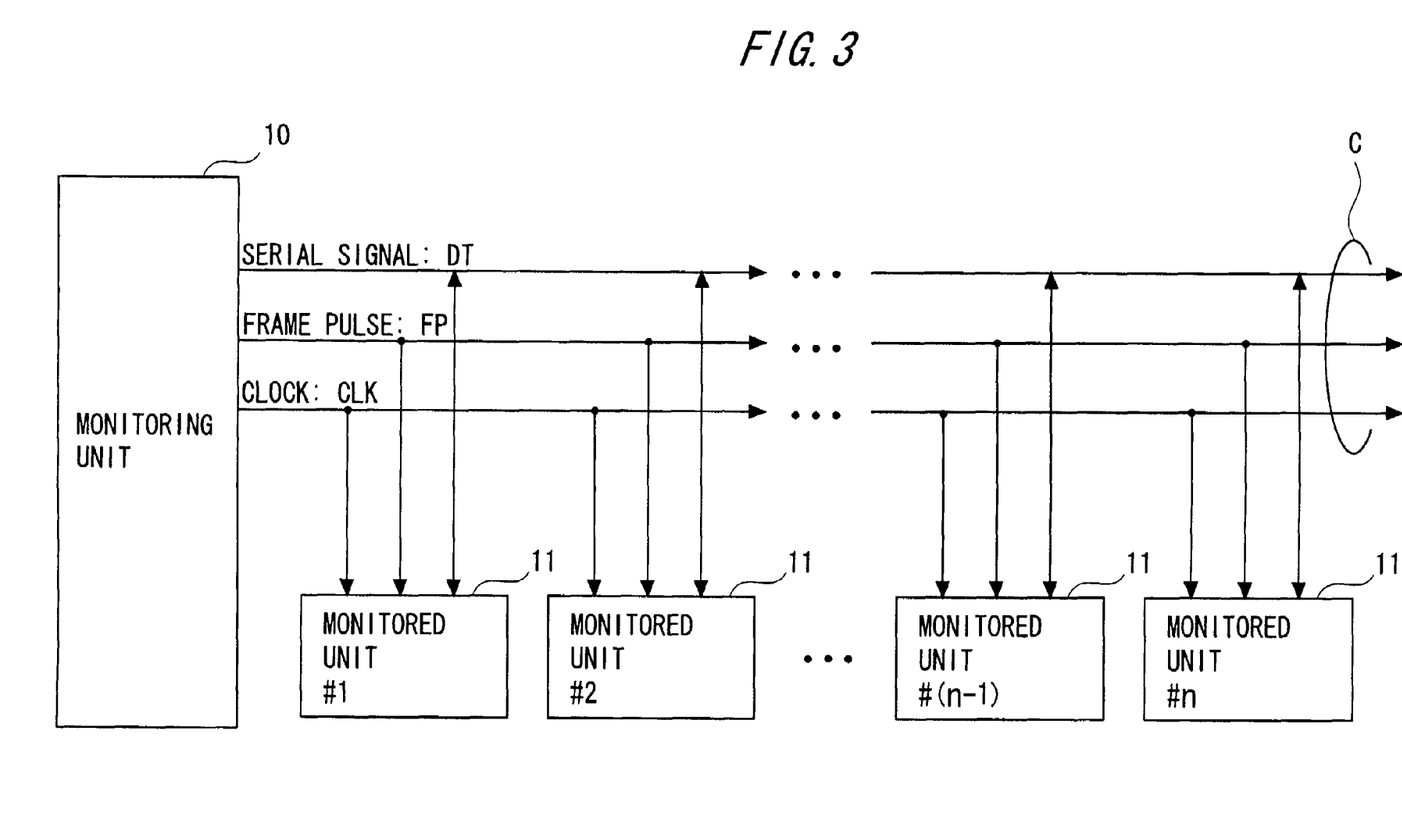
FIG. 3 is a diagram showing a configuration of a monitoring system according to an embodiment of the present invention.

FIG. 3 shows an example of a configuration of a monitoring system according to the embodiment of the present invention. The monitoring system illustrated in FIG. 3 is configured by a monitoring unit 10 as a monitoring apparatus and a plurality of monitored units #1, #2, . . . #(n-1), #n (which will hereinafter be generically referred to as the [monitored units 11] in the case of designating the monitored unit unless specified).

The monitoring unit 10 and the monitored units 11 as monitored apparatuses are connected to each other in a bus-type connection via a signal line C (a communication line) containing buses for transmitting and receiving a serial signal DT (data), a frame pulse FP and a clock CLK.

Pieces of information of the monitoring unit 10 and each of the monitored units 11 are transmitted as serial signals allocated based on time division multiplexing (TDM) onto the bus for the serial signal DT, and are thus transmitted and received between the monitoring unit 10 and the monitored units 11.

The frame pulse FP indicates a head of a frame into which the information of the monitoring unit 10 and the monitored units 11 is time-division-multiplexed. The monitoring unit 10 transmits the flame pulse FP and each of the monitored units 11 receives the flame pulse FP.

The clock CLK is a synchronization signal (clock pulse) to take synchronization between the monitoring unit 10 and the monitored units 11, and is transmitted from the monitoring unit 10 to each of the monitored units 11. Hence, each of the monitored units 11 takes slave synchronization.

<Explanations of Variety of Signals>

Figure 4:
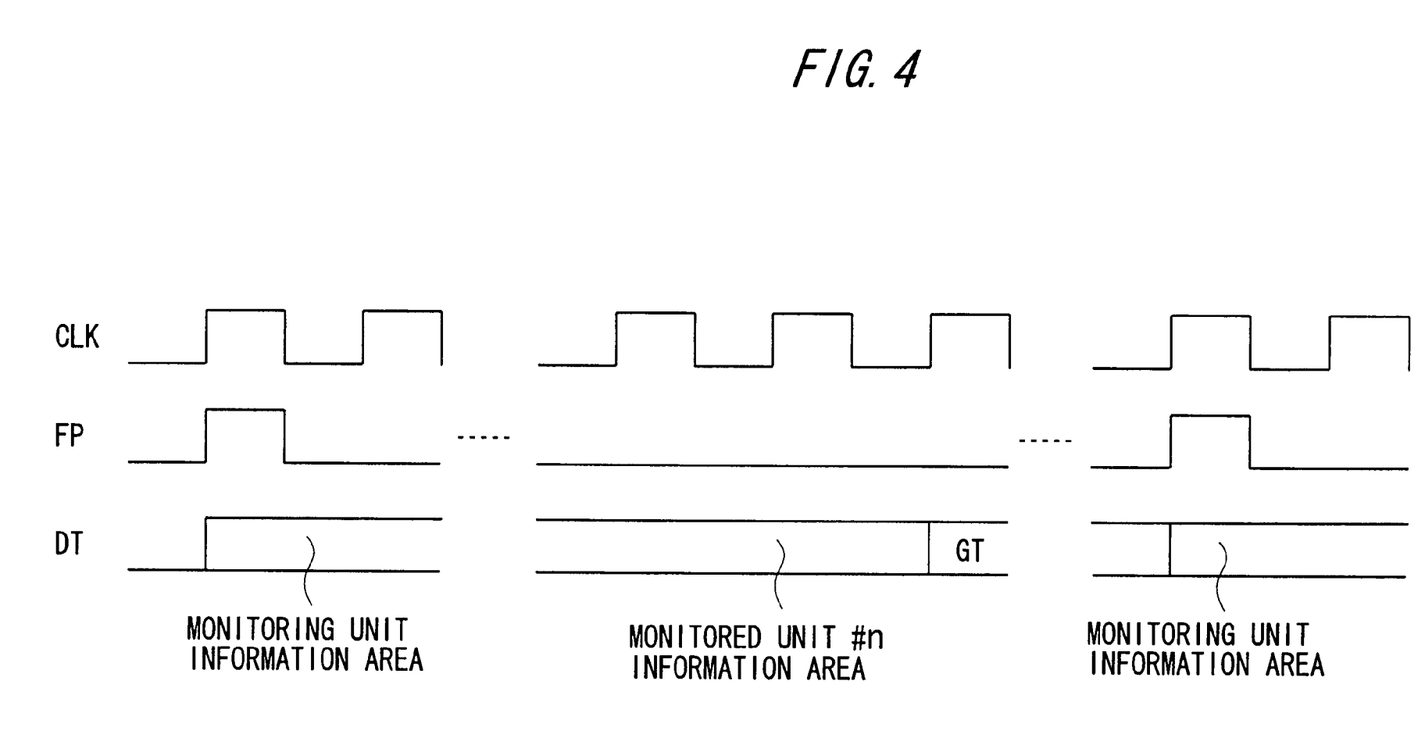
FIG. 4 is a diagram showing a relationship between a clock CLK, a frame pulse FP and a serial signal DT.

FIG. 4 is a diagram showing a relationship between the serial signal DT (data), the frame pulse FP and the clock CLK. The clock CLK is a clock kept ON for a fixed period of time at an equal interval. When the frame pulse FP is switched ON simultaneously with a rise of a certain clock pulse, the transmission of the frame is started. Upon finishing the frame transmission, the frame pulse is again switched ON according to the clock CLK, and the transmission of a next frame is started. Thus, the frames are cyclically transmitted based on the clock CLK and on the frame pulse FP.

Figure 5:
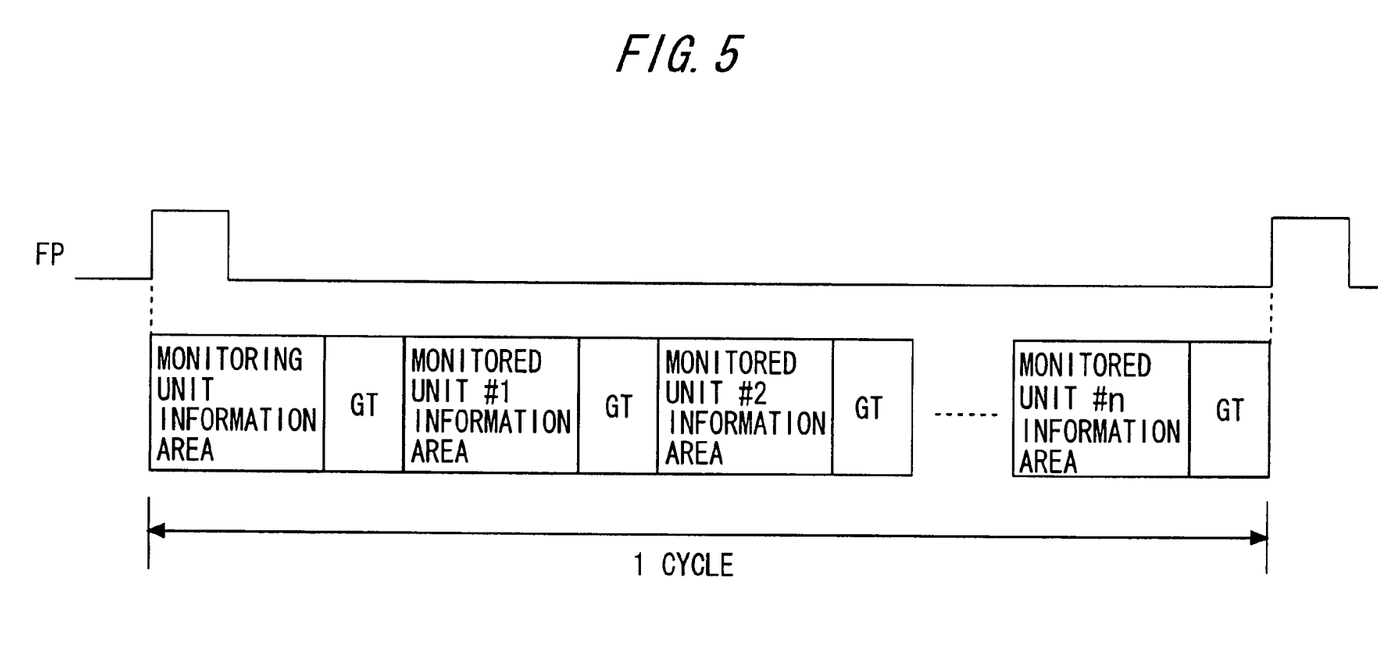
FIG. 5 is an explanatory diagram of an allocation example of timeslots (multiplexing positions) in one cycle in time-division-multiplexing communications.

FIG. 5 is an explanatory diagram showing one cycle of the serial signal DT. In one cycle, a monitoring unit information area serving as a head and information areas for the monitored units #1-#n are allocated in series, wherein fixed-length guard times (GT) are inserted in between the respective frames. The guard time is also provided posterior to the monitored unit frame for the monitored unit #n and neighbors to the head of a next frame (a next monitoring unit frame).

The monitoring unit information area is a multiplexing position (timeslot) assigned to the monitoring unit 10, and the monitoring unit frame is transmitted at this timeslot from the monitoring unit 10. Each monitored unit information area is a multiplexing position (timeslot) assigned to each monitored unit 11, and the monitored unit frame is transmitted at each timeslot from each of the monitored units 11. The information area of the monitoring unit 10 and the information areas of the monitored units 11 will hereinafter be generically termed the "timeslots".

The guard times (GT) are provided between each of the flames and are set in a way that takes account of a period of time needed for controlling a buffer which sends (reads)/captures (writes) the frame to and from the signal line C.

Figure 6:
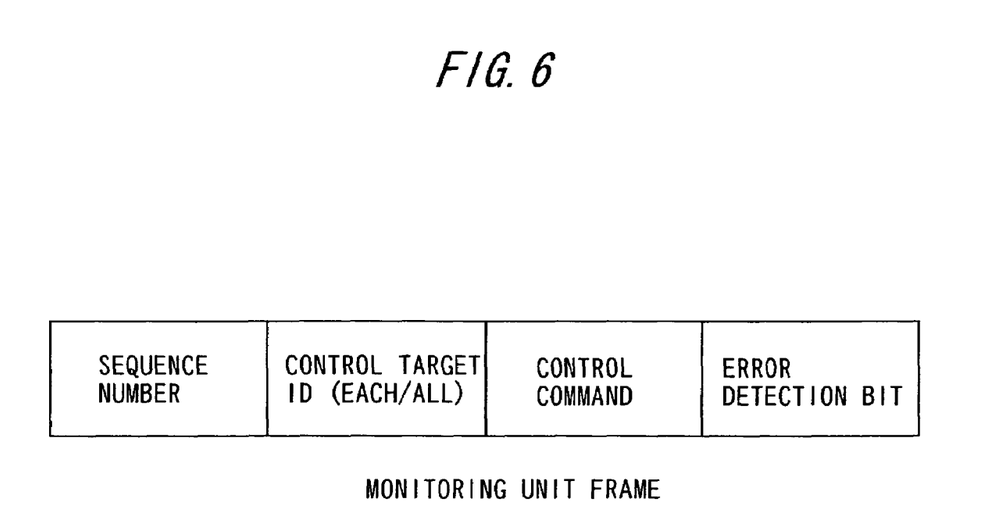
FIG. 6 is a diagram showing an example of a structure of a monitoring unit frame.

FIG. 6 is a diagram showing an example of a structure of the monitoring unit frame. The monitoring unit frame is defined as a fixed-length frame stored with the information (data) transmitted from the monitoring unit 10 to each monitored unit 11. In FIG. 6, the monitoring unit frame is composed of fields stored with a sequence number, a control target ID (each/all), a control command and an error detection bit.

The sequence number represents a sequence number of the monitoring unit frame. The control target ID is identifying information for one of the monitored units 11 becoming a control target or identifying information that specifies all of the monitored units 11 becoming control targets. The control command represents a control instruction with respect to the monitored unit 11 as a control target. The error detection bit is utilized for detecting an error in the monitoring unit frame.

Figure 7:
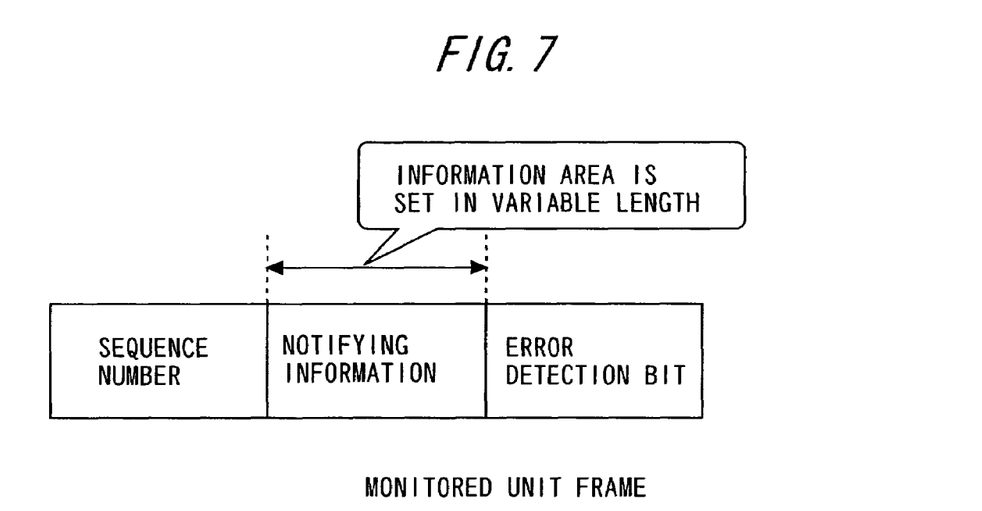
FIG. 7 is a diagram showing an example of a structure of a monitored unit frame.

FIG. 7 is a diagram showing a structure of the monitored unit frame. The monitored unit frame is a variable-length frame stored with the information (data) transmitted from the monitored unit 11 to the monitoring unit 10. In FIG. 7, a monitored unit information area is composed of fields stored with a sequence number, notifying information and an error detection bit. The "sequence number" field and the "error detection bit" field are fixed-length fields, while the "notifying information" field is a variable-length field.

The sequence number represents a sequence number of the monitored unit frame. The notifying information is information related to the monitored unit and is exemplified such as type information, status information and alarm information about the monitored unit. The error detection bit is used for detecting an error in the monitored unit frame.

<Configuration of Monitoring Unit>

Figure 8:
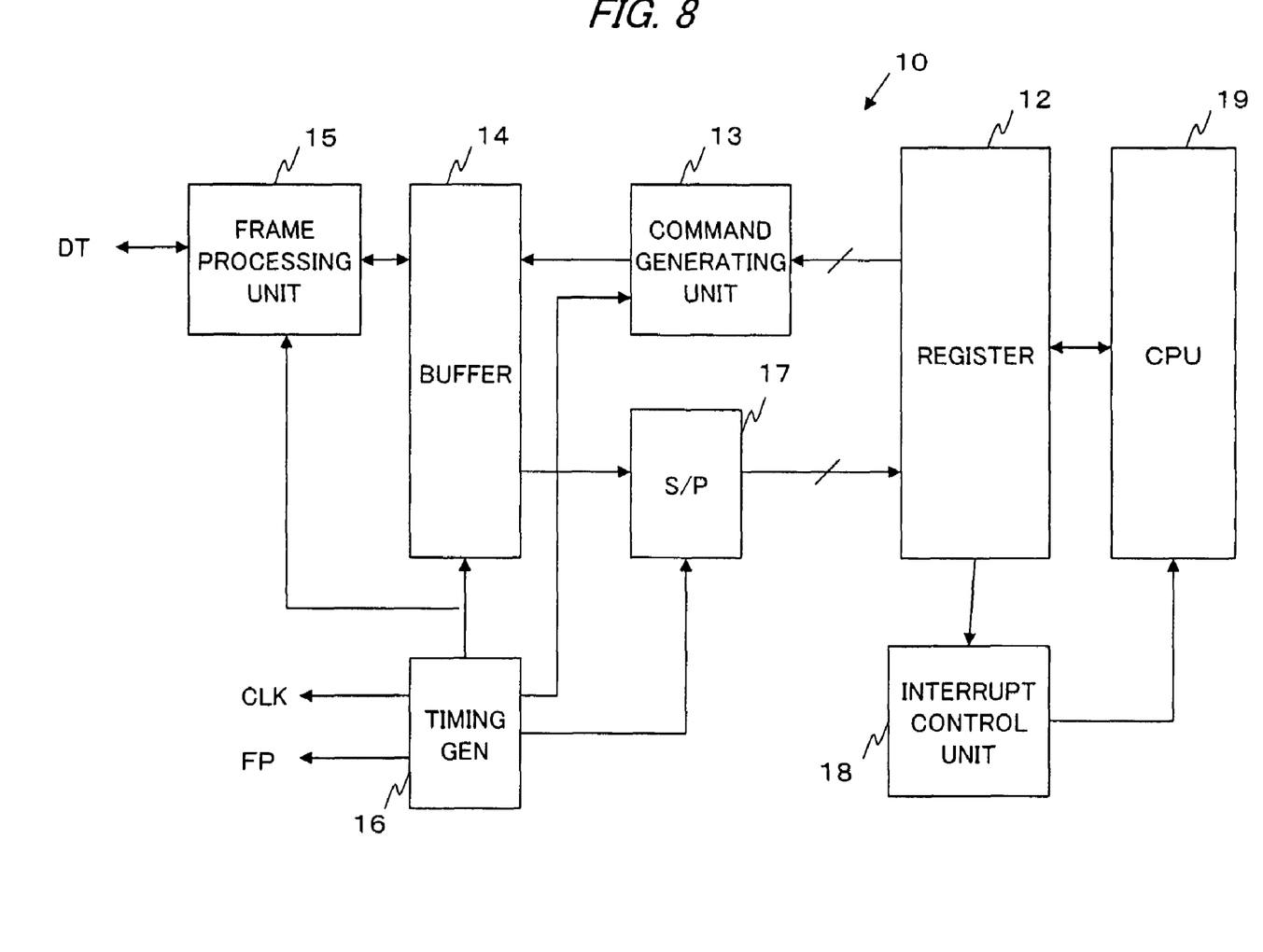
FIG. 8 is a diagram showing an example of a configuration of the monitoring unit.

FIG. 8 is a diagram illustrating an example of a configuration of main hardware of the monitoring unit 10. In FIG. 8, the monitoring unit 10 includes a CPU (Central Processing Unit) 19 functioning as a control unit and as a determining unit, a register 12, a command generating unit 13, a buffer (memory) 14, a frame processing unit 15 functioning as a notifying unit, as a transmitting unit and as a receiving unit, a timing generator (Timing GEN) 16, a serial/parallel converter (S/P) 17 and an interrupt control unit 18.

The CPU 19 executes a variety of processes for monitoring and controlling each of the monitored units 11. For example, the CPU 19 executes a process of judging (determining or identifying) a implementing (connecting) status and a type of each of the monitored units 11, a process of determining a length of the timeslot (a timeslot length: an information area size) that should be allocated to each of the monitored units 11, a process of writing the information related to each of the monitored units 11 to the register 12, a process of reading the information stored in the register 12, an interrupt process corresponding to a command given from the interrupt control unit 18, and so on.

The register 12 is stored with the information related to each of the monitored units 11 that is written by the CPU 19 and with the notifying information received from each of the monitored units 11.

The command generating unit 13 acquires the information related to each of the monitored units 11 in parallel from the register 12, then generates a control command with respect to each of the monitored units 11, and writes the control command to the buffer 14. At this time, the control target ID is also written together with the control command. The control target ID may be acquired from those written to the register 12 and may also be generated by the command generating unit 13 from the information related to each of the monitored units 11.

As types of the control command, there are a monitored unit type information acquiring command (type information acquiring command), a monitored unit information area allocation command, and a monitored unit information area allocation start-up command.

The type information acquiring command is a command (instruction) that requests each of the monitored units 11 to notify of the type information of the monitored unit 11. The allocation command is a command (instruction) for designating the timeslot length allocated to each of the monitored units 11. The allocation start-up command is a command (instruction) for designating a start of transmitting the monitored unit frame with the timeslot length designated by the allocation command.

The buffer 14 is accumulated with the control target IDs and the control commands, which are written by the command generating unit 13. The control target ID and the control command are transferred to the frame processing unit 15 according to the frame pulse FP. The frame processing unit 15 generates the monitoring unit frame containing the control target ID and the control command, and sends the monitoring unit frame onto the signal line C (the bus for the serial signal DT). Further, the frame processing unit 15 receives the monitored unit frame from each of the monitored units 11 via the signal line C, and writes the notifying information contained in the monitored unit frame to the buffer 14.

The timing generator 16 generates the clock CLK and the frame pulse FP, and sends the generated clock and pulse onto the signal line C (the bus for the clock CLK and the bus for the frame pulse FP). Frame synchronization and timing synchronization are thereby taken between the monitoring unit 10 and each of the monitored units 11. The command generating unit 13, the buffer 14, the frame processing unit 15 and the S/P 17 operate based on the clock CLK and the frame pulse FP that are generated by the timing generator 16. For instance, the buffer 14 and the frame processing unit 15 transmit the monitoring unit frame at the monitoring unit information area.

The S/P 17 serially receives the notifying information from each of the monitored units 11, which is accumulated in the buffer 14, then parallel-converts the notifying information and writes the converted information to the register 12.

The interrupt control unit 18 analyzes a content of the notifying information given from each of the monitored units 11, which was written to the register 12, and, if the analyzed content of the notifying information requires early processing, instructs the CPU 19 to execute the process for the notifying information by way of an interrupt process.

<Configuration of Monitored Unit>

Figure 9:
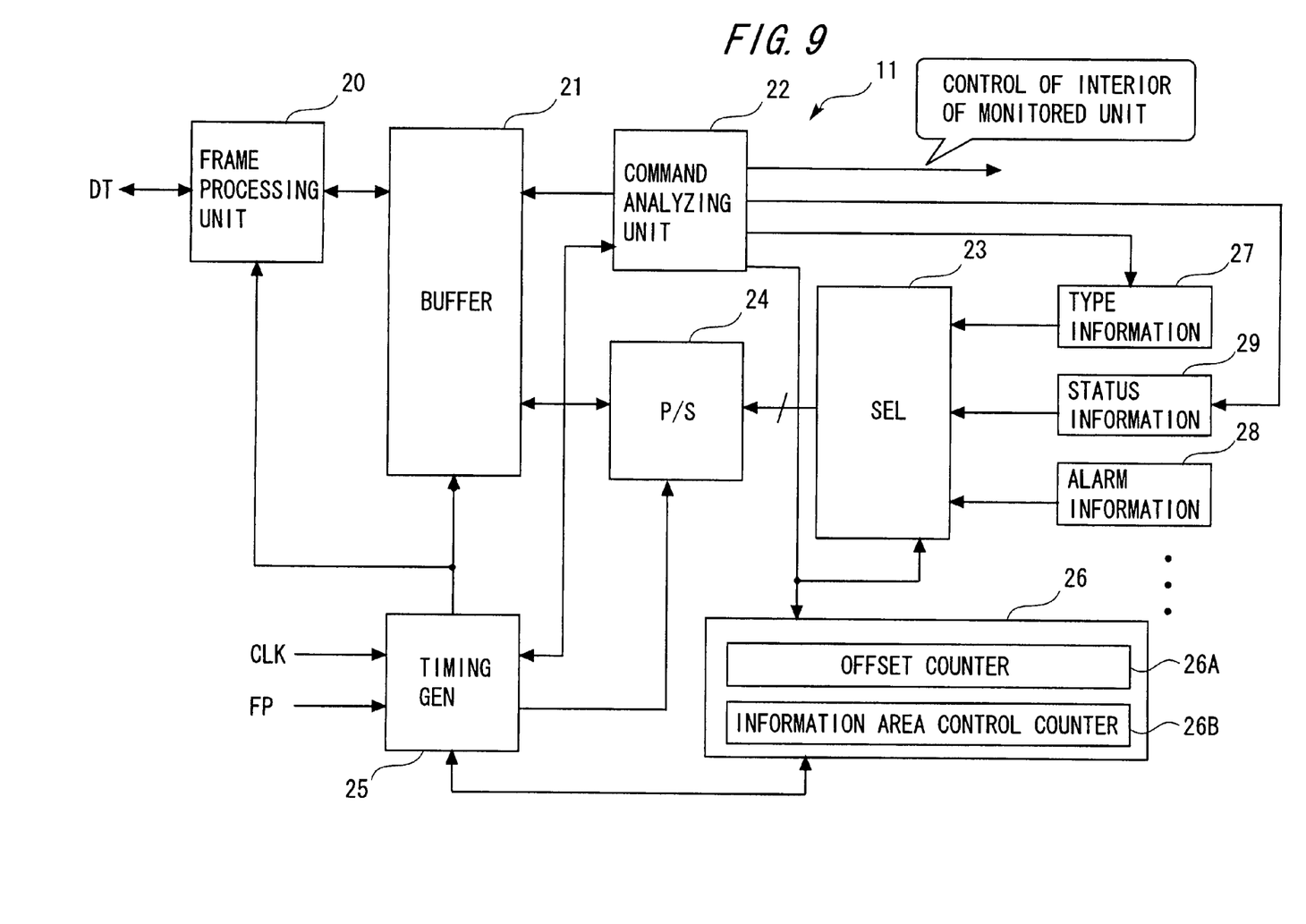
FIG. 9 is a diagram showing an example of a configuration of the monitored unit.

FIG. 9 is a diagram illustrating an example of a configuration of main hardware of the monitored unit 11, and shows a configuration related to generating and transmitting/receiving the frames. In FIG. 9, the monitored unit 11 includes a frame processing unit 20 functioning as a transmitting unit, as a notifying unit and as a receiving unit, a buffer (memory) 21, a command analyzing unit 22 functioning as a determining unit, a selector (SEL) 23, a parallel/serial converter (P/S) 24, a timing generator (Timing GEN) 25, an offset counter/information area control counter 26, a type information management unit 27, a fault monitoring unit 28 and a status monitoring unit 29.

The frame processing unit 20 refers to the control target ID of the monitoring unit frame received from the signal line C (the bus for the serial signal DT), captures, if the control target ID designates the monitored unit 11 itself, this monitoring unit frame, then extracts the control command from within the monitoring unit frame, and writes the control command to the buffer 21. Further, the frame processing unit 20 generates the monitored unit frame containing the notifying information read from the buffer 21, and sends the generated frame onto the signal line C.

The buffer 21 is accumulated with the control commands given from the frame processing unit 20 and with the notifying information given from the P/S 24.

The command analyzing unit 22 receives the control command accumulated in the buffer 21, and analyzes a content of the control command. The command analyzing unit 22 gives a control instruction to an unillustrated internal control target of the monitored unit in accordance with the content of the control command. At this time, if the control command is classified as a type information acquiring command, the command analyzing unit 22 gives a type information notifying instruction to the type information management unit 27.

Further, if the control command is classified as an allocation command, the command analyzing unit 22 sets an offset value and a target value, which are based on a timeslot length designated by the allocation command, in the offset counter/information area control counter 26, and also generates and inputs an information area acquisition acknowledgement to the selector 23. The information area acquisition acknowledgement is a defined as an acknowledgment message of having normally received the allocation command. Further, if the control command is classified as an allocation start-up command, the command analyzing unit 22 executes a process of changing the offset value and the target value (start-up flag control) with respect to the offset counter/information area control counter 26.

The selector 23 is constructed to receive an input of the notifying information such as the information area acquisition acknowledgement from the command analyzing unit 22, the type information from the type information management unit 27, an alarm from the fault monitoring unit 28 and the status information from the status monitoring unit 29. The selector 23 can select the notifying information corresponding to an instruction given from an unillustrated control unit within the monitored unit 11 and can output the selected notifying information to the P/S 24. Alternatively, the selector 23 may also be constructed to include a control unit that selects the should-be-outputted notifying information.

The P/S 24 serially converts the notifying information inputted in parallel from the selector 23 and sends the serial-converted notifying information to the buffer 21. The notifying information sent from the P/S 24 is written to the buffer 21.

The timing generator 25 acquires the clock CLK and the frame pulse FP from on the signal line C, and, since the monitored unit 11 operates based on the CLK and the FP, gives necessary instructions to the frame processing unit 20, the buffer 21, the command analyzing unit 22, the P/S 24 and the offset counter/information area control counter 26. Further, the timing generator 25 controls the start-up of the offset counter/information area control counter 26, and controls the operations of the frame processing unit 20, the buffer 21 and the P/S 24.

The offset counter/information area control counter 26 includes an offset counter 26A and an information area control counter 26B. The offset counter 26A is started up under the control (as by giving a start-up signal) of the timing generator 25 in accordance with the rise of the frame pulse FP as a trigger, and a counter value of the offset counter 26A is updated (e.g., increased) at an interval of the fixed time according to the clock CLK. The offset counter 26A, when the counter value reaches an offset value set by the command analyzing unit 22, gives the timing generator 25 a signal showing that the counter value reaches the offset value.

The information area control counter 26B is started up by a start-up signal given from the timing generator 25, wherein this start-up is triggered by the event that the counter value of the offset counter 26A reaches the offset value. The information area control counter 26B keeps updating (e.g., increasing) the counter value at the interval of the fixed time according to the clock CLK.

A counter value (target value) uniquely determined from the timeslot length indicated by the monitoring unit 10 is set in the information area control counter 26B. When the counter value reaches the target value, the information area control counter 26B notifies the timing generator 25 of a signal showing that the counter value reaches the target value.

Then, the timing generator 25 stops the offset counter 26A and the information area control counter 26B, and resets the respective counter values.

The timing generator 25, when receiving an offset value reaching signal and recognizing a timeslot start, makes the P/S 24, the buffer 21 and the frame processing unit 20 start the operation of transmitting the monitored unit frame. Thereafter, the timing generator 25, when receiving a target value reaching signal and recognizing a timeslot end, gets the transmitting operation finished.

The offset counter 26A is so constructed as to be capable of setting the plurality of offset values and the start-up flag for each of the offset values. Further, the information area control counter 26B is so constructed as to be capable of setting the plurality of target values and the start-up flag for each of the target values. The offset counter 26A and the information area control counter 26B are constructed, when the counter values reach the offset value and the target value in which the start-up flags are ON, so as to output an offset value reaching signal and a target value reaching signal to the timing generator 25.

The command analyzing unit 22, when receiving the allocation command, calculates the offset value and the target value on the basis of the timeslot length in the allocation command, and sets these values in the offset counter 26A and in the information area control counter 26B. At a point of time when setting these values, however, the start-up flags thereof are set OFF. Thereafter, the command analyzing unit 22, when receiving the allocation start-up command, controls the start-up flags of the respective counters 26A and 26B so that only the start-up flags of the offset value and of the target value based on the previous allocation command become "ON". Timing to notify the timing generator 25 of the offset value reaching signal and the target value reaching signal is thereby switched over, and the timeslot length of the monitored unit 11 can be also thereby changed.

The type information management unit 27 has a storage device stored with the type information of the self-device (the monitored unit 11). The type information management unit 27, in accordance with a type information notifying instruction given from the command analyzing unit 22, reads and outputs the type information to the selector 23.

The fault monitoring unit 28 monitors the self-device (the monitored unit 11), then generates, if a fault occurs in the self-device, alarm information corresponding to a content of this fault, and outputs the alarm information to the selector 23.

The status monitoring unit 29 monitors a status of the self-device (the monitored unit 11) and stores a piece of status information showing the status on the storage device. The status monitoring unit 29 can output, in response to the instruction given from the command analyzing unit 22, the stored status information to the selector 23.

It should be noted that the configuration of the monitored unit 11 may be sufficient on the condition that the type information, the status information and the alarm information are inputted to the selector 23, and the originating sources of the respective items of information are not limited to the type information management unit 27, the fault monitoring unit 28 and the status monitoring unit 29 illustrated in FIG. 9.

<First Operational Example>

Figure 10:
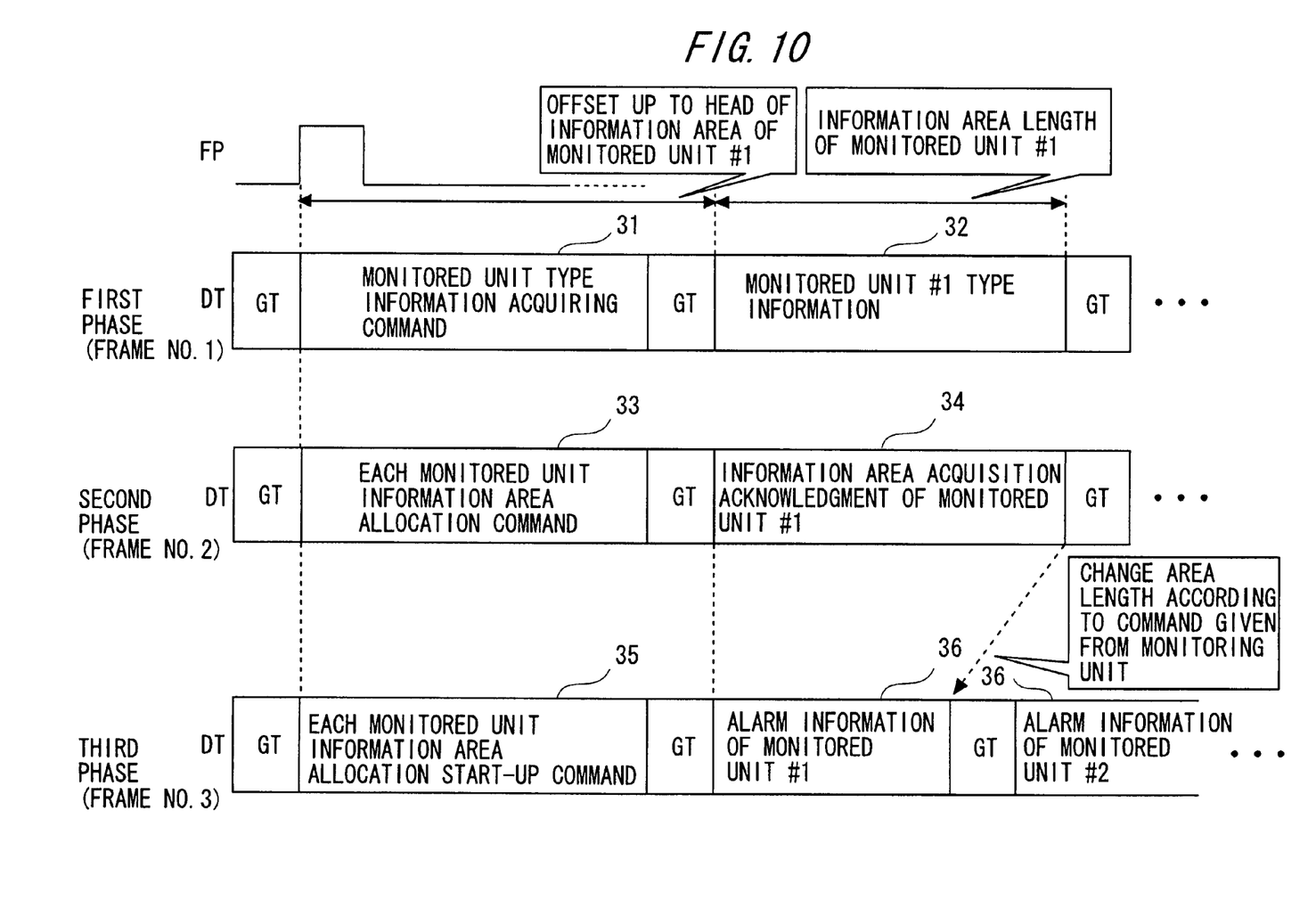
FIG. 10 is an explanatory diagram of a first operational example in the monitoring system.

FIG. 10 is a diagram showing an example of how the frame is transferred and received in the monitoring system shown in FIG. 1 (a first operational example). In FIG. 10, at predetermined first phase (frame No. 1) start timing, the monitoring unit 10 transmits the monitoring unit frame (which is referred to as a "type information acquiring frame 31") in which the type information acquiring command is stored in the control command field. The first phase can be schemed so as to be started when the monitoring unit 10 detects an occurrence of a change in the connection status (a new connection of the monitored unit 11, or removing of the monitored unit 11) of the monitored unit 11 to the monitoring unit 10.

The type information acquiring frame 31 is captured by each of the monitored units #1-#n via the bus for the serial signal DT. Each of the monitored units #1-#n analyzes the type information acquiring frame 31, and generates the monitored unit frame (which is referred to as a "type notifying frame 32": corresponding to information related to the monitored apparatus) in which the notifying information field is stored with the type information of the monitored unit itself on the basis of the type information acquiring command contained in this frame 31.

An offset value from the rise (the start of the first phase) of the frame pulse FP is set in each of the monitored units #1-#n, and each of the monitored units #1-#n transmits the monitored unit frame at the monitored unit information area (timeslot) allocated to the monitored unit itself in accordance with the offset value. A predetermined initial setting value (default value) is applied as the timeslot length of each of the monitored units 11 in the first phase.

For instance, the monitored unit #1 starts transmitting the monitored unit frame at the allocated timeslot after an end of the guard time (GT) subsequent to the type information acquiring frame 31. Herein, the monitored unit #1 transmits the type notifying frame 32 containing the type information of the monitored unit #1. This type notifying frame 32 is captured by the monitoring unit 10. At the timeslot of the monitored unit #1 and after the end of the guard time subsequent thereto, the monitored unit #2 transmits the type notifying frame 32 containing the type information of the monitored unit #2 to the monitoring unit 10. Similarly, each of the monitored units #3-#n transmits, in the first phase, the type notifying frame 32 containing the type information of the monitored unit itself to the monitoring unit 10.

In the monitoring unit 10, the CPU 19, whenever receiving the type notifying frame 32 from each monitored unit 11, determines the timeslot length, per monitored unit 11, corresponding to the type of each monitored unit 11 on the basis of the type information contained in this type notifying frame, and writes the timeslot length to the register 12. The command generating unit 13 generates the allocation command containing the timeslot length that should be allocated to each monitored unit 11, and writes the allocation command to the buffer 14.

When the monitoring unit 10 is notified of the type information of each of the monitored units #1-#n, the first phase is terminated, and it advances to a second phase (frame No. 2). In the second phase, the monitoring unit 10 generates, as triggered by the rise of the frame pulse FP, the monitoring unit frame (which will hereinafter be referred to as an "information area allocation frame 33") containing a monitored unit information area allocation command (containing the timeslot length allocated to each monitored unit 11) with respect to every monitored unit 11, and transmits the generated monitoring unit frame at the monitoring unit information area.

Each of the monitored unit 11 receives the information area allocation frame 33 via the signal line C. At this time, the command analyzing unit 22 calculates the offset value and the target value (start/end timing of the information area of the monitored unit itself) based on the timeslot length of each monitored unit 11 that is contained in the allocation command in the information area allocation frame 33, then sets these values in the offset counter 26A and in the information area control counter 26B, and inputs the information area acquisition acknowledgment ACK to the selector 23.

On the other hand, when the information area acquisition acknowledgment is inputted to the selector 23, a response frame (referred to as an "information area acquisition acknowledgment ACK frame 34") containing this acknowledgment is transmitted to the monitoring unit 10 at the timeslot of each monitored unit 11. For example, as illustrated in FIG. 19, the monitored unit #1 transmits the information area acquisition acknowledgment frame 34 to the monitoring unit 10 at the timeslot of the monitored unit #1. The monitored units #2-#n execute the same process. Thus, when the monitoring unit 10 receives the information area acquisition acknowledgment from each of the monitored units 11, the second phase (frame No. 2) is terminated, and it advances to a next third phase (frame No. 3).

In the third phase, the monitoring unit 10 generates the monitoring unit frame (referred to as an "allocation start-up frame 35") containing the allocation start-up command with respect to each monitored unit 11, and transmits the generated monitoring unit frame at the monitoring unit information area to each of the monitored units 11.

In each of the monitored units 11, the command analyzing unit 22, when judging that the control command is the allocation start-up command, controls the start-up flag of the offset counter 26A and the start-up flag of the information area control counter 26, and changes the setting of the start-up flags of the offset value and of the target value of the respective counters 26A and 26B.

At this time, if there is a difference between the timeslot length designated by the allocation command and the timeslot length at the start of the first phase, the timeslot lengths are changed according to the difference. For example, as shown in FIG. 10, the timeslot length of the monitored unit #1 is changed, in the third phase, shorter than the timeslot lengths in the first and second phases. If the timeslot length allocated to the monitored unit #1 is larger than the timeslot length at the start of the first phase, the monitored unit #1, from the third phase onward, transmits the monitored unit frame to the monitoring unit 10 at the timeslot longer than in the first and second phases.

On the other hand, in the monitored units #2-#n, when the timeslot length of the monitored unit with the timeslot existing anterior to the self-unit is changed, the start timing (offset value) of the timeslot of the monitored unit itself is changed corresponding to the difference between the timeslot lengths. The example shown in FIG. 10 is that the offset value of the monitored unit #2 is changed small corresponding to a degree (of decrement) to which the timeslot length of the monitored unit #1 decreases. Further, the timeslot lengths of the monitored units #2-#n increase or decrease based on the timeslot length included in the allocation command. Thus, the timeslots of the respective monitored units designated by the allocation command in the second phase are applied all together in the third phase.

Note that in the example illustrated in FIG. 10, the monitored unit frame (referred to as an "alarm information frame 36" containing, as the notifying information, the alarm information given from the fault monitoring unit 28, is transmitted from each of the monitored units #1-#n.

Thus, the timeslot length (an information area size) used for each of the monitored units 11 to transmit the data to the monitoring unit 10 is made variable. In this way, the timeslot length is made variable per monitored unit in accordance with the type of the monitored unit 11, whereby the efficient data transmission can be conducted. This enables the monitoring unit 10 to collect pieces of notifying information from the respective monitored units 11.

<Omission of Monitored Unit Information Area>

The operational example described above shows the operation in the case where all of the monitored units #1-#n are connected to the monitoring unit 10. The monitoring unit 10, which is constructed as the unit to which n-pieces of monitored units 11 are connectable, monitors the connecting status (implementing status) of each of the monitored units #1-#n, and can, if a certain monitored unit 11 is not connected to the monitoring unit 10, omit the timeslot that should be allocated to this monitored unit 11. Further, the guard time as a concomitant of the timeslot to be omitted can be also omitted.

For instance, in the connecting position of the monitored unit #3, if in an unconnected status of the monitored unit #3 to the monitoring unit 10, the monitoring unit 10 is unable to, in the first phase, receive the type notifying frame 32 from the monitored unit #3. In this case, the CPU 19 of the monitoring unit 10 can determine, for the reason that the type notifying frame 32 is not sent back from the monitored unit #3, that the timeslot length allocated to the monitored unit #3 is set to zero ("0"). The information of this timeslot length "0" is transmitted to each of the monitored units 11, as part of the allocation command with respect to each of the monitored units 11. In this case, the monitored unit #4 recognizes the timeslot length of the monitored unit #3 is "0", and changes the offset value so that the timeslot of the monitored unit #4 is started subsequent to the timeslot of the monitored unit #2 and after the end of the guard time.

Thus, the information area (timeslot) for the unconnected (unimplemented) monitored unit 11 is omitted, thereby making it possible to reduce the one-cycle time and enabling the monitoring unit 10 to collect the data efficiently.

It is to be noted that if the monitoring unit 10 detects, after omitting the timeslot, the connection (implementing) of the monitored unit 11 that corresponds to this omitted timeslot, the first through third phases for allocating the timeslot to this monitored unit 11 are carried out. In this case, each monitored unit 11 receiving the type information acquiring command in the first phase changes the offset value related to the timeslot of each monitored unit itself to the default value.

<Modified Example>

The first operational example described above has exemplified the case in which each of the first through third phases is finished in one cycle. Depending on the system configuration, however, such a case might possibly occur that a certain monitored unit 11 is unable to properly transmit a response to the control command received in the same cycle at the information area (timeslot) allocated to this monitored unit itself. For example, there might possibly occur such a case that, in the first phase in FIG. 10, the monitored unit #1 can not transmit the type notifying frame 32 corresponding to the type information acquiring frame 31 at the timeslot in the same cycle (the timeslot is terminated in the middle of transmitting the frame 32).

In this case, for instance, the same phase is repeatedly executed in a next cycle. In the example described above, in the next cycle, the first phase is repeatedly executed, and the monitored unit #1 transmits (retransmits) the type notifying frame 32 to the monitoring unit 10. Thus, the monitoring unit 10 can be, if capable of judging that the responses could be received from all of the monitored units 11 in the connected (implemented) status, configured to advance to the next phase.

Note that a scheme in the first operational example is that if the type notifying frame 32 (status notifying frame) about a certain monitored unit 11 is not received, the monitoring unit 10 judges this monitored unit 11 not to be implemented (not to be connected). It can be schemed that this type of judgment is made in a case where even if the same phase is repeated twice or more, the monitoring unit 10 can not normally receive the response frame. Alternatively, in one phase, if the monitoring unit 10 can not absolutely detect a signal on the serial signal DT at the timeslot of a certain monitored unit, it may be judged that this monitored unit 11 is not implemented (not connected).

<Second Operational Example>

Figure 11:
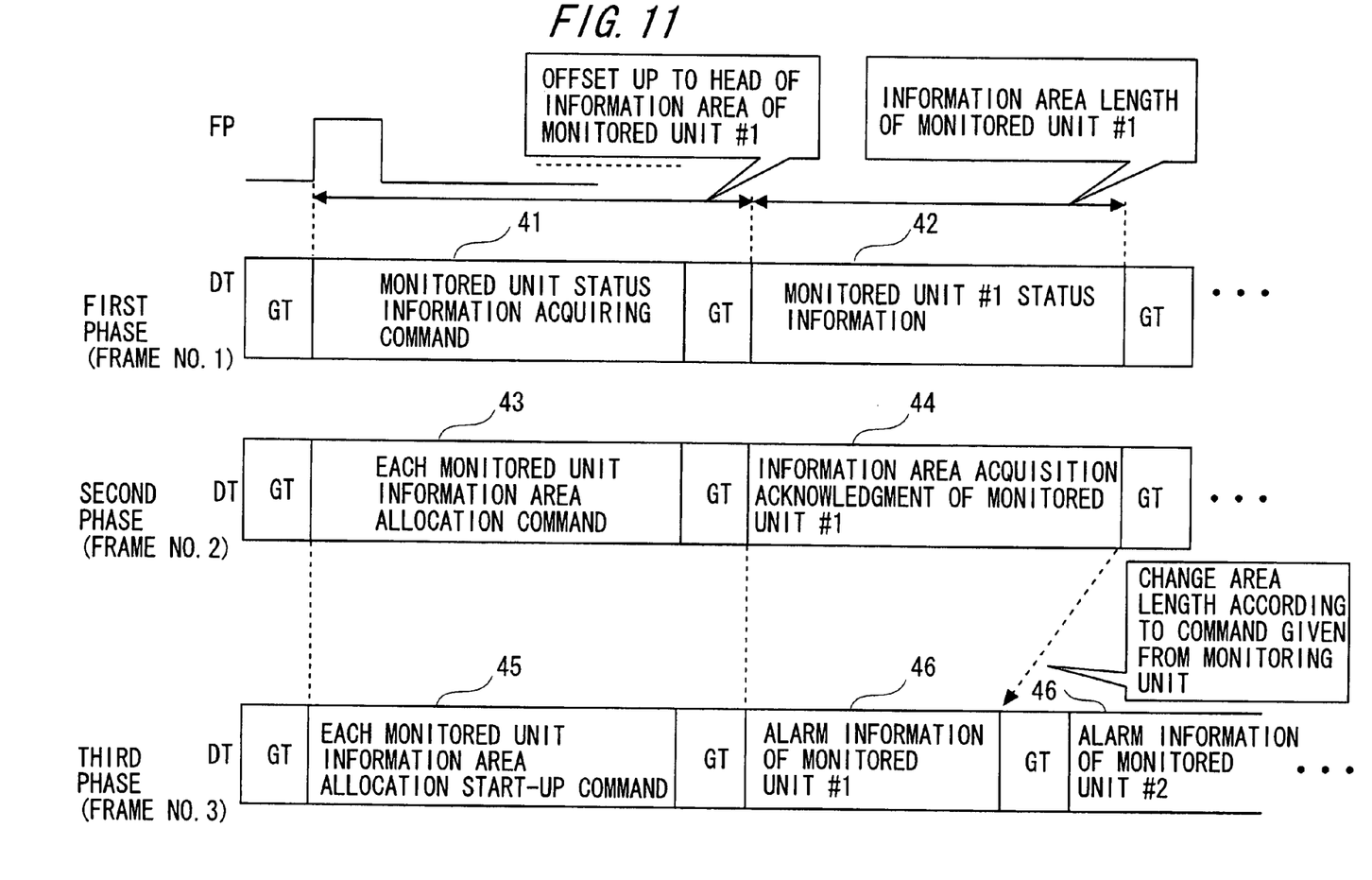
FIG. 11 is an explanatory diagram of a second operational example in the monitoring system.

FIG. 11 is a diagram showing an example (a second operational example) of transferring and receiving the frame in the monitoring system illustrated in FIG. 1. In FIG. 11, at predetermined first phase (frame No. 1) start timing, the monitoring unit 10 transmits the monitoring unit frame (referred to as a "status information acquiring frame 41") in which the control command field is stored with a status information acquiring command of the monitored unit, which serves to obtain the status information from the monitored unit 11. The second operational example (first phase start timing) is schemed to be started, e.g., periodically.

The status information acquiring frame 41 is captured by each of the monitored units #1-#n via the bus for the serial signal DT. Each of the monitored units #1-#n analyzes the status information acquiring frame 41 and generates, based on the status information acquiring command contained in this frame 41, the monitored unit frame (referred to as a "status notifying frame 42": corresponding to information related to the monitored apparatus) in which the notifying information field is stored with the status information of the monitored unit. Namely, the command analyzing unit 22 gives a status notifying instruction to the status monitoring unit 29, thereby generating the status notifying frame 42 containing the status information outputted from the status monitoring unit 29.

The offset value (which is herein a default value) from the rise (a start of the cycle) of the frame pulse FP is set in each of the monitored units #1-#n, and each of the monitored units #1-#n transmits, based on the offset value, the monitored unit frame at the timeslot allocated to the monitored unit itself. For instance, the monitored unit #1 starts transmitting the monitored unit frame after the end of the guard time subsequent to the status information acquiring frame 41.

Herein, the monitored unit #1 transmits the status notifying frame 42 containing the status information of the monitored unit #1. This status notifying frame 42 is captured by the monitoring unit 10. The monitored unit #2 transmits the status notifying frame 42 containing the status information of the monitored unit #2 to the monitoring unit 10 at the timeslot of the monitored unit #1 and after the end of the guard time subsequent thereto. Similarly, each of the monitored units #3-#n transmits, in the first phase, the status notifying frame 42 containing the status information of the monitored unit to the monitoring unit 10.

In the monitoring unit 10, the CPU 19, whenever receiving the status notifying frame from each monitored unit 11, determines, per monitored unit 11, a usable information area size (a timeslot length) and an offset value that correspond to the status of each monitored unit 11 on the basis of the status information contained in this status notifying frame, and writes the information area size and the offset value to the register 12. The command generating unit 13 generates the allocation command containing the offset value and the timeslot length that should be allocated to each monitored unit 11, and writes the allocation command and the timeslot length to the buffer 14.

When the monitoring unit 10 is notified of the status information of each of the monitored units #1-#n, the first phase is terminated, and it advances to the second phase (frame No. 2). In the second phase, the monitoring unit 10 generates, as triggered by the rise of the frame pulse FP, the monitoring unit frame (which will hereinafter be referred to as an "information area allocation frame 43") containing a monitored unit information area allocation command (containing the offset value and the timeslot length that are allocated to each monitored unit 11) with respect to every monitored unit 11, and transmits the generated monitoring unit frame at the monitoring unit information area.

Each of the monitored unit 11 receives the information area allocation frame 43 via the signal line C. At this time, the command analyzing unit 22 extracts the offset value and the timeslot length of the monitored unit itself from the allocation command in the information area allocation frame 43, then sets offset value in the offset counter 26A and the target value based on the timeslot length in the information area control counter 26B, and inputs the information area acquisition acknowledgment to the selector 23.

On the other hand, when the information area acquisition acknowledgment is inputted to the selector 23, a response frame (referred to as an "information area acquisition acknowledgment frame 44") containing this acknowledgment is transmitted to the monitoring unit 10 at the timeslot of each monitored unit 11. For example, as illustrated in FIG. 11, the monitored unit #1 transmits the information area acquisition acknowledgment frame 44 to the monitoring unit 10 at the timeslot of the monitored unit #1. The monitored units #2-#n execute the same process. Thus, when the monitoring unit 10 receives the information area acquisition acknowledgment from each of the monitored units 11, the second phase (frame No. 2) is terminated, and it advances to the next third phase (frame No. 3).

In the third phase, the monitoring unit 10 generates the monitoring unit frame (referred to as an "allocation start-up frame 45") containing the allocation start-up command with respect to each monitored unit 11, and transmits the generated monitoring unit frame at the monitoring unit information area to each of the monitored units 11.

In each of the monitored units 11, the command analyzing unit 22, when judging that the control command is the allocation start-up command, controls the start-up flag of the counters 26A and 26B so that only the start-up flags of the offset value and of the target value set in the second phase are set (become) "ON". At this time, if there is a difference between the timeslot length designated by the allocation command and the timeslot length at the start of the first phase, the timeslot lengths are changed according to the difference. For example, as shown in FIG. 11, the timeslot length of the monitored unit #1 is changed, in the third phase, shorter than the timeslot lengths in the first and second phases.

On the other hand, in the monitored units #2-#n, when the timeslot length of the monitored unit with the timeslot existing anterior to the monitored unit is changed, the start timing (offset value) of the timeslot of the monitored unit is changed corresponding to the difference between the timeslot lengths. The example shown in FIG. 11 is that the offset value of the monitored unit #2 is changed small corresponding to a degree (of decrement) to which the timeslot length of the monitored unit #1 decreases. Further, the timeslot lengths of the monitored units #2-#n increase or decrease based on the timeslot length in the allocation command.

Note that in the example illustrated in FIG. 11, the monitored unit frame (referred to as an "alarm information frame 46" containing, as the notifying information, the alarm information given from the fault monitoring unit 28, is transmitted from each of the monitored units #1-#n.

Thus, the timeslot length (the information area size) used for each of the monitored units 11 to transmit the data to the monitoring unit 10 is made variable corresponding to the status of each of the monitored units 11. A quantity of the notifying information transmitted by the monitored unit 11 to the monitoring unit 10 is increased and decreased corresponding to the status. The timeslot length is changed based on the notifying information quantity corresponding to the status, whereby the data can be transmitted at the increased transmission efficiency from each of the monitored units 11 to the monitoring unit. This enables the monitoring unit 10 to collect the notifying information from the respective monitored units 11 in a short period of time.

<Modified Example>

As for the second operational example, the monitoring unit 10 and the monitored unit 11 can be modified as follows. The notifying information quantity corresponding to the status of the monitored unit 11 can be classified into some classes (levels). For example, the notifying information quantity can be classified into three classes (levels) such as "small", "normal" and "large".

In this case, the monitoring unit 10 generates, as a substitute for the timeslot length, the allocation command containing, in place of the timeslot length, class designating information corresponding to a status of the unit. On the other hand, the storage device included in each of the monitored units 11 is previously stored with a correspondence table that retains the respective classes and the timeslot lengths corresponding to the classes. The command analyzing unit 22, when obtaining the allocation command, acquires the class designating information contained in this allocation command, and obtains the timeslot length corresponding to the class designating information from the correspondence table. Then, the control unit included in the monitored unit 11 calculates, based on the timeslot length, the offset value and the target value (timeslot start/end timing) of the offset counter 26A and of the information area control counter 26B, and executes the setting process for these values.

Note that in the second operational example also, such a scheme can be applied that the unconnected (unimplemented) status of the monitored unit is detected (judged), and the corresponding timeslot is omitted in accordance with a result of this detection.

<Others>

The embodiment discussed above has given the description, wherein the first operational example is conducted in the case where the monitored units 11 are connected/disconnected to and from the monitoring unit 10, and the second operational example is periodically started. The requirement indispensable for the present invention is not, however, such that the monitoring system executes both of the first operational example and the second operational example. Namely, the monitoring system according to the present invention is established as the system that executes any one of the first operational example and the second operational example.

Accordingly, in the case where the monitoring system executes only the first operational example, the configuration (e.g., the status monitoring unit 29) related to transferring and receiving the status information can be omitted from the configurations of the monitoring unit 10 and of the monitored unit 11 shown in FIGS. 8 and 9. By contrast, in the case where the monitoring system executes only the second operational example, the configuration (e.g., the type information management unit 27) related to transferring and receiving the type information can be omitted from the configurations of the monitoring unit 10 and of the monitored unit 11 explained with reference to FIGS. 8 and 9.

The configuration explained in connection with the first operational example and the configuration described in regard to the second operational example can be properly combined within the range that does not deviate from the purpose of the present invention.

<Operation and Effect of Embodiment>

In the embodiment, the time division multiplexing method of the serial interface is applied to transmitting the information from the plurality of monitored units 11 to the monitoring unit 10. In the first operational example of the embodiment, the type information of each of the monitored units 11 is transmitted to the monitoring unit 10. According to the type information, the monitoring unit 10 recognizes the type and the implementing status of each of the monitored units 11, and allocates the necessary information area (timeslot) per monitored unit.

Each of the monitored units 11 transmits the information to the monitoring unit 10 on the basis of the timeslot information received from the monitoring unit 10. With this operation, it is possible to make variable the timeslot of the monitored unit in accordance with the type and the implementing status of each of the monitored units 11 and to increase the transmission efficiency.

Further, in the second operational example of the time division multiplexing method of the serial interface according to the embodiment, the monitored unit 11 transmits the status information of the unit to the monitoring unit 10. The monitoring unit 10 allocates the timeslot having a size necessary for the efficient data transmission on the basis of the status (the quantity of the information to be transmitted to the monitoring unit 10 increases in a state where, e.g., a large number of alarms occur) of each of the monitored units 11. Each of the monitored units 11 transmits, based on the received timeslot information, the notifying information to the monitoring unit 10. This enables the information quantity to be variable for every status of each of the monitored units 11 and the transmission efficiency to be increased.

The category (the number) of the monitoring alarm (notifying information)/(control information (control command) is normally determined depending on the classification according to the type of the monitored unit. Hence, if the type of the monitored unit 11 implemented in the monitoring system is known, the using area (timeslot) for transmitting and receiving the required information can be determined.

In the first operational example, the timeslot is determined based on the type information of the monitored unit, and the notifying information is transmitted by use of the determined timeslot. Accordingly, the optimal timeslot can be allocated according to every type of monitored unit 11, and transmission efficiency can be improved.

Moreover, the category (the number) of the monitoring information/control information increases and decreases depending on the status of the monitored unit 11. If a service of a certain monitored unit 11 is suspended, the monitoring information/control information is not required to be transmitted as the case may be. While on the other hand, the number of pieces of monitoring information/control information becomes larger in an abnormal state of the monitored unit 11 than in a steady state.

Hence, if the type of the monitored unit 11 implemented in the monitoring system is known, the using area (timeslot) for transmitting and receiving the required information can be increased and decreased. In the second operational example, the timeslot length of each of the monitored units 11 is increased and decreased based on the status information of the monitored unit 11. The optimal area allocation can be thereby done according to every status of the monitored unit 11, and the rise in the transmission efficiency can be actualized.

<Others>

The embodiment discussed above discloses the following inventions. The following inventions can be combined according to the necessity within the range that does not deviate from the purpose of the present invention.

The disclosures of Japanese patent application No. JP2006-208536 filed on Jul. 31, 2006 including the specification, drawings and abstract are incorporated herein by reference.

What is claimed is:

1. A monitoring apparatus connected via a communication line to monitored apparatuses and serially receiving notifying information given from each of the monitored apparatuses with time division multiplexing communications, a single timeslot being periodically allocated to each of the monitored apparatuses for every cycle having a fixed time length, the monitoring apparatus comprising:

a receiving unit to receive information related to each of the monitored apparatuses via the communication line from each of the monitored apparatuses;

a determining unit to determine a timeslot length of the single timeslot having a variable length to be allocated to each of the monitored apparatuses on the basis of the information related to each of the monitored apparatuses as received by the receiving unit; and a notifying unit to notify each of the monitored apparatuses of the timeslot length determined by the determining unit via the communication line, wherein the receiving unit receives the notifying information from each of the monitored apparatuses at the single timeslot based on the timeslot length that is allocated to each of the monitored apparatuses.

2. The monitoring unit according to claim 1, wherein the information related to each of the monitored apparatuses is type information for each of the monitored apparatuses, and the determining unit determines the timeslot length to be allocated to each of the monitored apparatuses based on the type information.

3. The monitoring unit according to claim 1, wherein when it is detected, from the information related to each of the monitored apparatuses, that a certain monitored apparatus in the monitored apparatuses is not connected to the monitoring apparatus, the determining unit determines the timeslot length allocated to the certain monitored unit is zero.

4. The monitoring unit according to claim 1, wherein the information related to each of the monitored apparatuses is status information for each of the monitored apparatuses, and the determining unit determines the timeslot length to be allocated to each of the monitored apparatuses based on the status information.

5. A monitored apparatus connected via a communication line to a monitoring apparatus and sending notifying information onto the communication line at a single timeslot allocated by the monitoring apparatus to transmit the notifying information to the monitoring apparatus, the single timeslot being periodically allocated for every cycle having a fixed time length, the monitored apparatus comprising:

a transmitting unit to transmit information related to the monitored apparatus via the communication line to the monitoring apparatus in response to a request given from the monitoring apparatus;

a receiving unit to receive via the communication line a timeslot length of the single timeslot having a variable length determined by the monitoring apparatus on the basis of the information related to the monitored apparatus; and a determining unit to determine start timing and end timing of the timeslot allocated by the monitoring apparatus on the basis of the timeslot length received by the receiving unit, wherein the transmitting unit transmits via the communication line the notifying information to the monitoring apparatus in accordance with the start timing and the end timing of the timeslot that are determined by the determining unit.

6. The monitored apparatus according to claim 5, wherein the information related to the monitored apparatus is type information for the monitored apparatus.

7. The monitored apparatus according to claim 5, wherein the information related to the monitored apparatus is status information of the monitored apparatus, and wherein the timeslot length corresponding to the status information is determined.

* * * * *